Oct. 13, 1964   E. H. FISHER   3,152,365

MOLDING APPARATUS

Filed Aug. 22, 1961   3 Sheets-Sheet 1

INVENTOR
E. H. FISHER
BY
ATTORNEY

INVENTOR
E. H. FISHER
BY
ATTORNEY

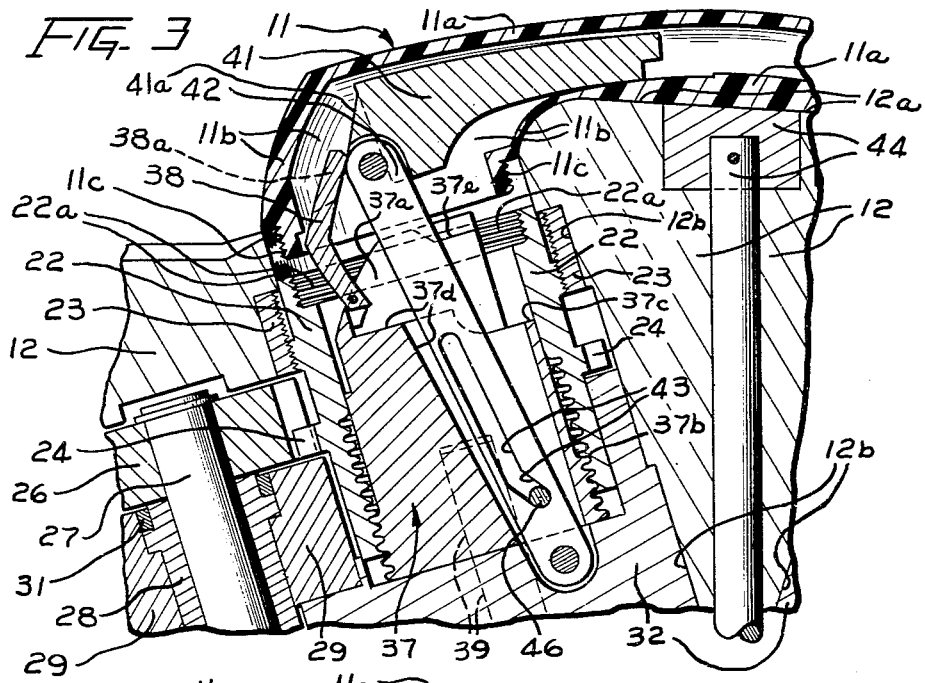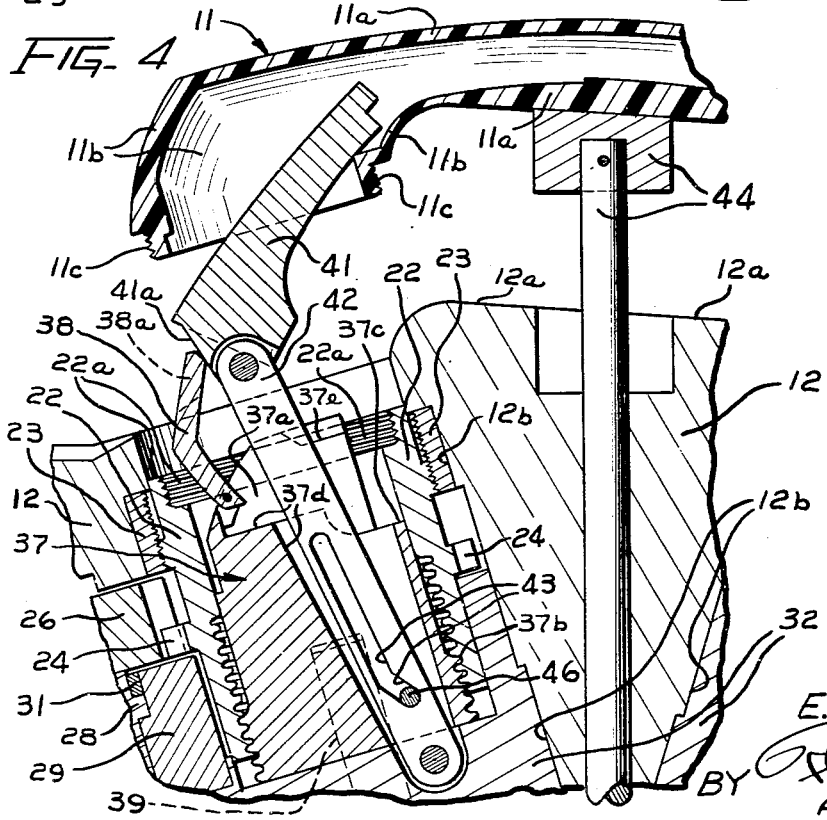

United States Patent Office 3,152,365
Patented Oct. 13, 1964

3,152,365
MOLDING APPARATUS
Everett H. Fisher, Shirley, Ind., assignor to Western Electric Company, Incorporated, New York, N.Y., a corporation of New York
Filed Aug. 22, 1961, Ser. No. 133,193
8 Claims. (Cl. 18—42)

This invention relates to injection molding apparatus, and more particularly to molding apparatus in which mold members for molding a piece part are drivingly connected to one another so that movement of one mold member into and out of molding position causes movement of another mold member into and out of molding position. It is an object of this invention to provide new and improved apparatus of this character.

In standard injection molding apparatus for injection molding of a substantially channel-shaped tubular part such as a handle of a telephone handset, wherein the handle has a tubular portion connecting a pair of spaced tubular leg portions which are angularly disposed with respect to the connecting portion, and which have exterior screw threads thereon, mold assemblies for forming inner portions of the handle and the screw threads include a plurality of individual mold members. These mold members must be manually assembled and placed in molding position for a molding operation, and after the molding operation the mold members for forming the inner portions of the tubular handle must be manually disassembled and removed from within the handle. Further, the mold members for forming the screw threads must be manually unscrewed from the handle. This procedure is undesirable because it is inefficient, uneconomical and relatively time consuming, especially where a large number of telephone handles are being manufactured.

Accordingly, another object of this invention is to provide new and improved molding apparatus for molding a substantially channel-shaped tubular part, such as a handle of a telephone handset, rapidly and economically.

Another object of this invention is to provide new and improved molding apparatus for molding a substantially channel-shaped tubular part wherein the apparatus is substantially automatic in its operation.

A further object of this invention is to provide new and improved molding apparatus in which a mold member which is driven into and out of molding position drives another mold member relative thereto into and out of molding position.

A still further object of this invention is to provide new and improved molding apparatus wherein a driven mold member for forming a screw thread on a tubular part drives another mold member into molding position as it is driven into molding position, and drives the other mold member out of molding position as it is driven out of molding position and unscrewed from the screw thread on the molded part.

A further object of this invention is to provide new and improved molding apparatus for molding a tubular part wherein the movement of one mold member for forming an inner cavity portion of the part out of molding position subsequently automatically causes movement of another mold member for forming an adjacent inner cavity portion of the part out of molding position.

A still further object of this invention is to provide new and improved molding apparatus for molding a tubular part wherein movement of mold members into molding position to mold adjacent inner cavity portions of the part, and removal of the mold members from the molded part after a molding operation, is greatly facilitated.

Another object of this invention is to provide new and improved molding apparatus for molding a tubular part wherein at least one of a plurality of mold members for forming adjacent inner cavity portions of the part is pivotally mounted to facilitate movement of the mold members into molding position, and to facilitate movement of the mold members out of the molded part after a molding operation.

A further object of this invention is to provide new and improved molding apparatus for molding a channel-shaped tubular part wherein driven mold members for forming screw threads on the tubular part drive mold members for forming adjacent inner cavity portions of the part into molding position as they are driven into molding position, and drive the mold members out of molding position as they are driven out of molding position and unscrewed from the screw threads on the molded part.

In accordance with one application of the invention, a mold or core assembly for molding a tubular part having an opening therein and an inner cavity including a portion extending laterally inward with respect to an edge of the opening, includes a first mold member for forming an inner cavity portion of the tubular part adjacent the laterally extending inner cavity portion, and a second mold member for forming the laterally extending inner cavity portion. The first and second mold members are drivingly connected to one another, and as the first mold member is driven into molding position the driving connection between the mold members drives the second mold member into molding position. After a molding operation, the first mold member is driven out of molding position so that the second mold member can move out of molding position. Subsequently, as the first mold member continues to move, the driving connection between the mold members drives the second mold member out of molding position so that the second mold member can move through the opening in the molded part.

In accordance with another application of the invention, a first mold member is screw threadably mounted in a molding die and is screw threadably connected to a second mold member. The screw threads of the threaded mounting of the first mold member are of the opposite hand as compared to the screw threads of the threaded connection of the members to one another. Thus, as the first mold member is rotated it moves into and out of molding position, and the screw threaded connection between the mold members causes the second mold member to move relative to the first mold member into and out of molding position.

In a preferred embodiment of the invention, pairs of first and second mold or core members are provided for forming adjacent inner cavity portions of a substantially channel-shaped tubular part such as a handle of a telephone handset. The first core members are carried on first operating members which include mold portions for forming inner cavity portions of the part adjacent the portions formed by the first and second core members, and the second core members are carried on second operating members. The first and second core members are pivotally mounted on their corresponding operating members to facilitate movement of the core members into molding position, and out of molding position and through openings in the molded part after a molding operation. Rotatable mold members are screw threaded into a molding die and each mold member includes a screw threaded mold portion for forming an exterior screw thread on the tubular part during the molding thereof. Each mold member rotates in one direction to move into molding position, and rotates in a reverse direction after a molding operation whereby it unscrews from the screw thread. The rotatable mold members are screw threadably connected to corresponding ones of the first operating members for moving the first operating members and the first core members into and out of molding position. Interengaging cam means on the first and second operating members move the second operating members to move the second core members thereon into molding position prior to the movement of the first operating members and first core members into molding position, and to move the second core members out of molding position after the first operating members and the first core members have moved out of molding position and out of the path of the second core members.

This invention, together with further objects and advantages thereof, will best be understood by reference to the following detailed description taken in connection with the accompanying drawings in which:

FIG. 3 is a reduced cross-sectional view similar to FIG. 2, showing the molding apparatus in a second open operating position after a molding operation; and FIG. 4 is a reduced cross-sectional view similar to FIG. 2, showing the molding apparatus in a third open operating position after a molding operation.

Figure 1:
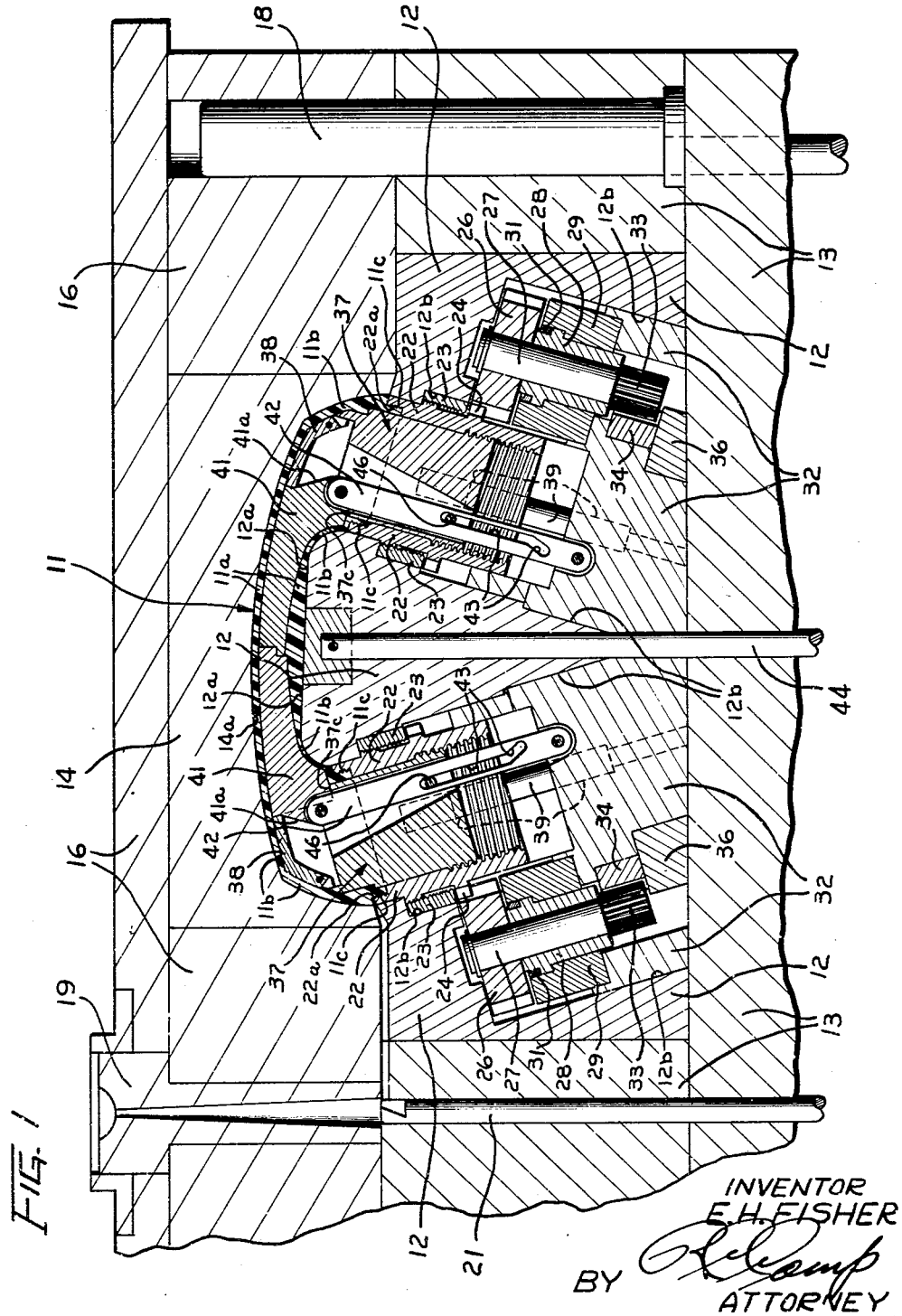
FIG. 1 is a vertical cross-sectional view of the molding apparatus taken substantially along its center line and showing the apparatus in a closed molding position.

As is best shown in FIG. 1, the illustrated embodiment of the invention is designed for molding a substantially channel-shaped tubular part, such as a handle 11 of a telephone handset. The handle 11 includes a central tubular portion 11a connecting a pair of laterally spaced tubular leg portions, which serve as transmitter and receiver housings 11b of the handle. The housings 11b are angularly disposed with respect to the central tubular portion 11a, have open ends, and include exterior screw threads 11c for receiving screw threaded transmitter and receiver cap members (not shown). It is to be understood that this embodiment is solely for the purpose of illustrating the principles of the invention, and that the principles of the invention are not limited to the specific arrangement shown, but may be used in other arrangements as may readily be devised by those skilled in the art.

Referring to FIG. 1, it is seen that the illustrated embodiment of the invention includes a lower molding die 12 carried on a lower platen 13, and an upper molding die 14 carried on an upper platen 16, the upper and lower platen being movable toward and away from one another on suitable guide shafts (not shown). The molding dies 12 and 14 include mold surfaces 12a and 14a substantially corresponding to exterior surfaces of the telephone handle 11 and forming walls of a mold cavity. The lower platen 13 is provided with upstanding guide pins 18 receivable in apertures in the upper platen 16 for insuring proper alignment of the molding dies 12 and 14 in their closed position.

At the upper left-hand side of FIG. 1, a sprue bushing 19, designed to receive an injection nozzle (not shown), communicates with a suitable runner system leading to the mold cavity, for injecting molding material into the cavity. Directly below the sprue bushing 19, a notched sprue pulling pin 21 for pulling the sprue out of the sprue bushing when the platens 13 and 16 are opened after a molding operation, is mounted for vertical reciprocating movement in the lower platen 13, so as to be movable upward when the platens are in their open position, for a purpose subsequently to be described.

Figure 2:
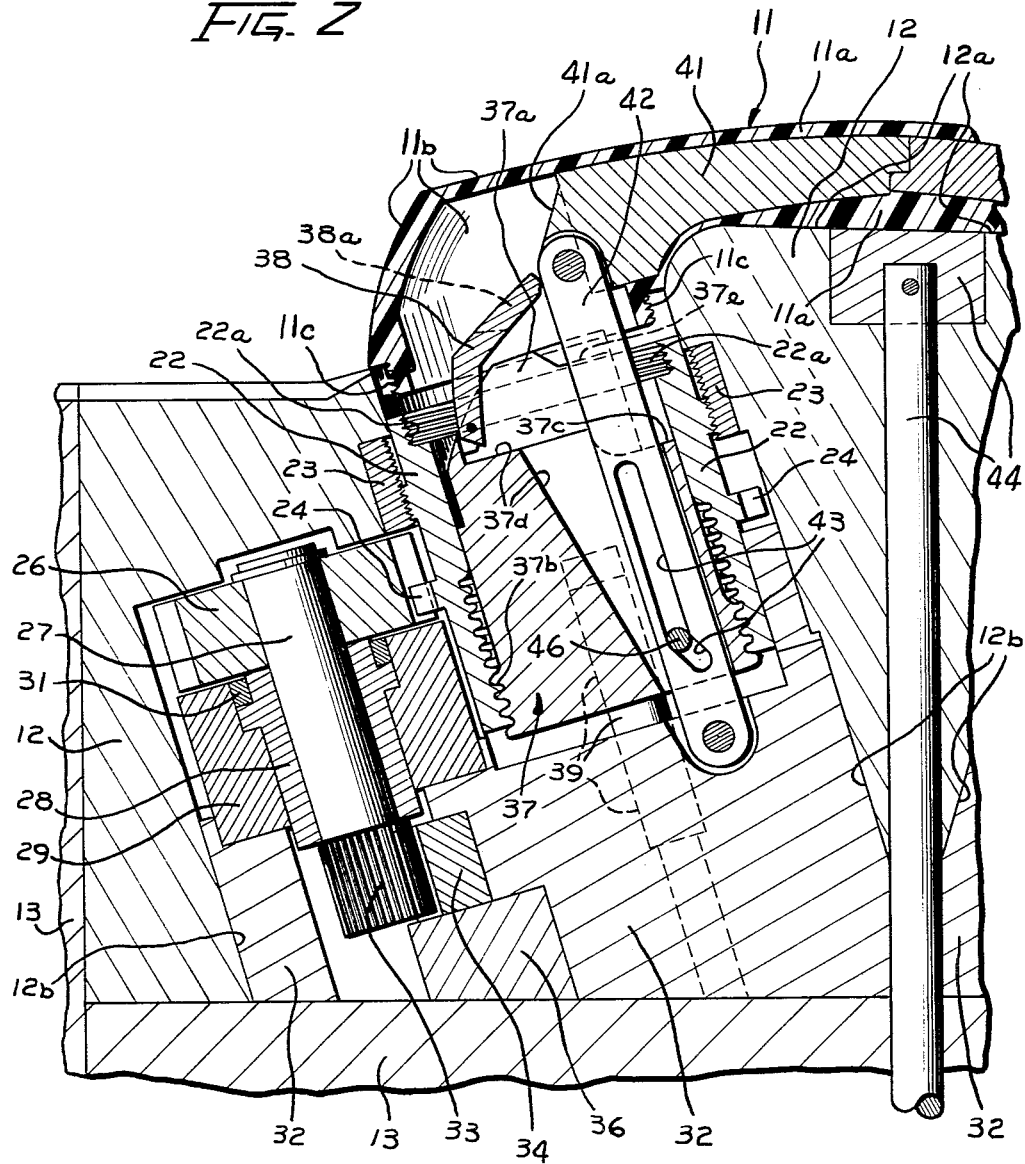
FIG. 2 is an enlarged partial cross-sectional view similar to FIG. 1, but showing the molding apparatus in a first open operating position after a molding operation.

The end of each housing 11b, including its screw threads 11c, is formed during a molding operation by a substantially cylindrical hollow mold member 22 provided at its upper end with annular mold cavity surfaces 22a, which include annular interior screws threads 22a corresponding to the exterior screw threads 11c of the housing. Each mold member 22 is rotatable about its axis and is screw threaded into a hollow cylindrical threaded member 23 suitably secured in a cylindrical portion of a large recess 12b in the lower molding die 12, as for example by silver soldering. The screw threaded mountings of the mold members 22 and the mold cavity screw threads 22a all have the same thread pitch. Thus, as each mold member 22 is rotated in one direction its screw threaded mounting causes the mold member to move axially into molding position (FIG. 1) for a molding operation, and as the mold member is rotated in a reverse direction after a molding operation its screw threaded mounting causes the mold member to move axially out of molding position with the mold cavity screw threads 22a unscrewing from the corresponding screw threads 11c on the molded handle 11 (FIG. 2).

Rotation of each mold member 22 is accomplished through gear teeth 24 extending around the outer periphery of the mold member and engaged with a gear 26 keyed to the upper end of a shaft 27 and retained on the shaft by a suitable retaining clip. Each shaft 27 is rotatably mounted in a suitable bearing 28 which is force-fitted into an aperture extending through a cylindrical lower die part 29, and which is retained in the die part 29 by a screw threaded retaining ring 31. Each lower die part 29 is force-fitted into a cylindrical recess in a support block 32 suitably mounted in the recess 12b of the lower molding die 12, as for example by dowel pins or bolts.

At the lower end of each shaft 27, a gear 33 is keyed to the shaft and is engaged with a gear rack 34 mounted in the lower plate 13 for reciprocating movement and extending through suitable aligned apertures in the lower die 12 and the corresponding support block 32. The part of each gear rack 34 adjacent its associated gear 33 is slidably supported on a member 36 suitably secured in the corresponding support block 32, as for example by screws. The gear racks 34 are reciprocated by a suitable mechanism (not shown) in timed relationship with the opening and closing of the molding dies 12 and 14 so that when the molding dies are moved to their closed position (FIG. 1) the cylindrical mold members 22 are rotated in one direction and move axially into molding position, and so that when the molding dies are moved to their open position (FIGS. 2-4) the cylindrical mold members 22 are rotated in the other direction and move axially out of molding position and unscrew from the screw threads 11c on the molded handle 11, as described hereinabove.

In molding the handle 11, the greater part of the inner surfaces of each of the housings 11b is formed by the upper end of a cylindrical core member 37, which includes a pair of laterally spaced upstanding projections 37a, and by an elongated mold or core member 38 pivoted at one of its ends on the core member 37 between the projections 37a for a purpose subsequently to be described. When the core members 37 and the mold members 38 are in molding position (FIG. 1), each mold member 38 cooperates with its associated core member 37, including the upstanding projections 37a thereof, to form substantially continuous mold cavity walls corresponding to the inner surfaces of the associated housing.

The core members 37 and the pivoted mold members 38 thereon are moved into and out of molding position by the rotation of the hollow screw threadably mounted mold members 22, and for this purpose each core member 37 includes screws threads 37b adjacent its lower end extending around the periphery thereof and screw threaded into the corresponding hollow mold member 22, with the screw threads 37b being of the opposite hand as compared to the screw threads for mounting the mold member 22 in the lower molding die 12. Rotation of each core member 37 with its associated mold member 22 is prevented by a pair of laterally spaced dowel pins 39 extending parallel to the direction of axial movement of the core member, the upper ends of the dowel pins being received in downwardly opening apertures in the core member, and the lower ends of the dowel pins being force-fitted against shoulders in apertures in the corresponding support block 32. Thus, as the mold members 22 rotate and move axially into an out of molding position, the screw threads 37b cause each core member 37 to move axially relative to its associated mold member into and out of molding position therewith. Further, so that each core member 37 will move relative to its associated mold member 22 at a substantially greater speed than the mold member, the thread pitch of its screw threads 37b is substantially greater than the thread pitch of the screw threads for mounting the mold member 22 in the lower molding die 12. For example, in the illustrated embodiment, the thread pitch of the screw threads 37b is twice the thread pitch of the screw threads for mounting the mold member 22.

The part of the inner surfaces of each housing 11b adjacent the part of the surfaces formed by its associated core member 37 and pivoted mold member 38 are formed during a molding operation by a pivotally mounted elongated core member 41 defining mold cavity walls corresponding thereto. Each core member 41 is supported in molding position (FIG. 1) spaced from the walls of the mold cavity defined by the surfaces 12a and 14a of the molding dies, by engagement with a stop 37c formed by the upper edge of the corresponding core member 37. In addition, as shown in FIG. 1, when the core members 41 are in molding position the opposed free ends thereof are engaged with one another in mutually supporting relationship.

Each pivoted mold member 38 functions as a cap for a slot 37d through the core member 37 on which it is mounted, the upper portion of the slot 37d being formed by the upstanding projections 37a of the core member. The free end of the pivoted mold or cap member 38 includes laterally projecting lugs 38a on the opposite sides thereof which rest on ledges 37e on the core member projections 37a for supporting the mold member in molding position (FIG. 1) with the free end adjacent its associated elongated core member 41. Thus, the mold member 38 and the core member 41 cooperate to prevent molding material from flowing into the slot 37d during a molding operation.

As each pivoted mold member 38 moves out of molding position with its associated core member 37, the free end of the mold member engages a tapered cam surface 41a on the elongated core member 41 associated therewith. The tapered cam surface 41a causes the mold member 38, the pivoted end of which is free to move in the slot 37d in the core member, to pivot upward about its pivotal axis as shown in FIG. 2. This pivotal movement of the mold member permits subsequent linear movement of the elongated core member 41 out of molding position to a position as shown in FIG. 3, by mechanism now to be described.

Each core member 41 is pivoted on an upper end of a mold member in the form of an elongated operating lever 42 which extends downward through the lower portion of the slot 37d in the corresponding core member 37, and which is pivoted at its lower end on a pin mounted in the corresponding support block 32. Each operating lever 42 includes a slot 43, having a lower portion which extends obliquely with respect to the longitudinal axis of the lever, and having an upper portion which extends substantially parallel to the direction of movement of the corresponding core member 37 when the elongated core member 41 which is pivoted on the lever is in molding position (FIG. 1). Mounted in each core member 37 is a pin 46 which extends across the slot 37d thereof and through the slot 43 in the corresponding operating lever 42. Thus, as the hollow mold members 22 and the core members 37 mounted therein move out of molding position as shown in FIG. 2, the pins 46 move in the upper portions of the slots 43 of the operating levers and the elongated pivoted core members 41 re-main in molding position. Subsequently, as shown in FIG. 3, as the core members 37 continue to move out of the openings in the housings 11b of the molded handle 11, the pin 46 move into the lower obliquely disposed portions of the slots 43 and cam the operating levers 42 about their pivotal axes to move the elongated core members 41 pivoted thereto out of molding position, whereby the core members 41 are free to pivot and to move out of the openings in the housings.

When the pins 46 reach the bottoms of the slots 43 and the elongated core members 41 reach the positions shown in FIG. 3, referring to FIG. 4, a vertically movable knockout bar 44 under the center of the molded handle 11 is moved vertically by suitable mechanism (not shown) to move the molded handle 11 upward relative to the lower die 12. At the same time, the sprue pulling pin 21 is moved vertically upward whereby the sprue (not shown) and runner system (not shown) attached to the handle move with the handle. As the molded handle 11 continues to be moved vertically by the knockout bar 44, the elongated core members 41 pivot about their pivotal axes and move out of the openings in the housings 11b, and ultimately clear the openings and fall downward of their own weight onto the lower die 12. The molded handle 11, sprue and runner system then can be removed from between the molding dies in any suitable manner, as for example by a comb and tray assembly mounted adjacent one side of the molding apparatus and movable between the molding dies when they are in their open position.

After the molded handle 11 has been removed from between the molding dies and the dies have been suitably cleared, the platens 13 and 16 are moved to their closed position and the gear racks 34 are operated to rotate the gears 26 and 33, and thus the threadably mounted hollow mold members 22, to move the mold members 22, the core members 37 screw threaded therein, the pivoted mold members 38, and the elongated pivoted core members 41 into molding position. In this regard, during initial movement of the core members 37 by the hollow mold members 22, the pins 46 move in the lower oblique portions of the slots 43 to move the elongated core members 41 toward one another. At the same time, the free ends of the pivoted mold members 38 are supported on and move along the operating levers 42. Subsequently, as the core members 37 continue to move, the free ends of the mold members move along the tapered cam surfaces 41a of the pivoted core members 41. When the core members 37 reach molding position, the stops 37c engage the pivoted core members 41 to support the core members 41 in spaced relationship with respect to the walls of the mold cavity formed by the molding dies 12 and 14, and the ledges 37e come into engagement and supporting relationship with respect to the lugs 38a of the pivoted mold members 38, as described hereinabove. When all of the various members are back in molding position, as shown in FIG. 1, the molding operation can be repeated to mold another handle 11.

While the illustrated embodiment of the invention is shown as forming a substantially channel-shaped tubular part such as a handle of a telephone handset, it is apparent that piece parts of other shapes readily could be molded employing apparatus embodying the principles of this invention. For example, one side of the illustrated apparatus readily could be modified and used to mold a substantially L-shaped part having only a single opening therein and including a cavity having a portion extending laterally inward with respect to the opening. In this regard, depending on the length of the inwardly extending cavity portion and the core member 41 with respect to the size of the opening in the part, the core member may or may not be pivotally mounted to facilitate movement thereof through the opening. Similarly, it is contemplated that adjacent portions of the core member 41 and its associated mold member 38 could be designed so that the mold member 38 could be constructed as an integral part of its associated core member 37, rather than as a member pivoted thereon. It is also contemplated that one of the screw threadably mounted mold members 22 and the core member 37 threadably mounted therein, could be suitably modified and used by themselves to form a piece part where it is desired that one mold member move into and out of molding position at a greater rate than the other. It is to be understood that the foregoing examples are merely illustrative of how the principles of this invention could be utilized, and that other embodiments of this invention readily will be apparent to those skilled in the art.

Particular attention is directed to the fact that according to this invention new and improved apparatus has been provided which is particularly useful for molding a tubular part having an opening therein and having an inner cavity portion extending laterally inward with respect to an edge of an opening. More specifically, new and improved apparatus has been provided for molding a tubular part of this type in which a core member for forming the inner cavity portion of the part readily is removable through the opening in the molded part, even where the inner cavity portion extends inward at substantially a right angle to a cavity portion of the part directly above the opening, is relatively elongated with respect to the size of the opening, and is of substantial thickness at its innermost end with respect to the size of the opening, whereby removal of the core member from the molded part through the opening normally would be extremely difficult.

From the foregoing description it is apparent that the screw threadably mounted mold members 22, the mold or core members 37 screw threaded in the mold members 22, and the pivoted mold or core members 38 and 41, all cooperate to provide molding apparatus for molding substantially channel-shaped parts such as telephone handles 11, which is substantially automatic in its operation. In this regard, the several mold members are interrelated such that by merely rotating the mold members 22 to move the mold cavity screw threads 22a thereof into molding position, and to unscrew the screw threads from the screw threads 11c of a molded handle 11 after a molding operation, the entire mold or core assembly, including the mold members 37, 38 and 41, is automatically moved into and out of molding position. This movement of the mold assembly into and out of molding position is facilitated greatly by the pivotal mounting of the mold members 38 to permit substantially linear movement of the elongated pivoted mold members 41 out of molding position whereby they can pivot about their pivotal axes, and by the pivotal mounting of the pivoted mold members 41 whereby they can move out of the openings in the housings 11b of the molded handle. The foregoing all combine to produce molding apparatus in which the necessity of manually assembling mold members in molding position for forming inner portions of the telephone handle 11 and the screw threads 11c on the handle, and subsequently manually disassembling and removing the mold members from the molded handle after a molding operation, substantially is eliminated, and thus these handles can be manufactured in large quantities rapidly and economically.

While certain embodiments of the invention have been disclosed many modifications will be apparent, and it is intended that the invention be interpreted as including all modifications which fall within the true spirit and scope of the invention.

What is claimed is:

1. In apparatus for molding a substantially channel-shaped tubular part, wherein the part includes a tubular portion connecting a pair of spaced cylindrical tubular legs angularly disposed with respect to the tubular connecting portion and having open ends and screw threads thereon, the combination which comprises a pair of hollow substantially cylindrical members, each of said members being screw threadably mounted for rotation about its axis and including a screw threaded mold portion for forming the screw thread on one of the legs of the part, a pair of substantially cylindrical non-rotatable members screw threadably mounted in said rotatable members and having slots extending substantially axially therethrough, the screw threads of the threaded mounting of each of said rotatable members being of the opposite hand as compared to the screw threads of the threaded mounting of its associated non-rotatable member therein, and the threaded pitch of the threaded mounting of each of said rotatable members being substantially equal to the thread pitch of its threaded mold portion, mold means on said non-rotatable members for forming inner portions of the part, operating levers mounted in the slots of said non-rotatable members for movement substantially radially with respect to said members, elongated core members having ends mounted on said levers for forming inner portions of the part adjacent the portions formed by said mold means and including the interior of the tubular connecting portion, said core members further having free ends engageable with one another when said core members are in molding position, drive means for rotating each of said rotatable members relative to its associated non-rotatable member whereby the threaded mounting of said non-rotatable member in said rotatable member causes said non-rotatable member to move axially relative to said rotatable member, interengaging means on each of said levers and its associated non-rotatable member for moving said lever substantially radially with respect to said non-rotatable member to move said lever's associated elongated core member into and out of molding position in a substantially linear direction during a portion of the movement of said non-rotatable member, said drive means rotating said rotatable members whereby each of said non-rotatable members moves axially relative to its associated rotatable member and said interengaging means move said levers to move said core members into molding position, said rotatable and non-rotatable members subsequently moving said threaded mold portions and said mold means into molding position, and said drive means rotating said rotatable members to unscrew said threaded mold portions from screw threads formed thereby on the legs of the molded part, and to move said threaded mold portions and said mold means out of molding position whereby said core members can move out of molding position, said interengaging means subsequently moving said levers to move said core members out of molding position so that said core members can move through the open ends of the legs of the molded part.

2. In apparatus for molding a substantially channel-shaped tubular part, wherein the part includes a tubular portion connecting a pair of spaced cylindrical tubular legs angularly disposed with respect to the tubular connecting portion and having open ends and screw threads thereon, the combination which comprises a pair of hollow substantially cylindrical members, each of said members being screw threadably mounted for rotation about its axis and including a screw threaded mold portion for forming the screw thread on one of the legs of the part, a pair of substantially cylindrical non-rotatable members screw threadably mounted in said rotatable members and having slots extending substantially axially therethrough, the screw threads of the threaded mounting of each of said rotatable members being of the opposite hand as compared to the screw threads of the threaded mounting of its associated non-rotatable member therein, and the thread pitch of the threaded mounting of each of said rotatable members being substantially equal to the thread pitch of its threaded mold portion, first mold members for forming inner portions of the part, each of said first mold members being pivoted at one of its ends on one of said non-rotatable members, operating levers mounted in the slots of said non-rotatable members for movement substantially radially with respect to said members, elongated second mold members pivoted on said levers for forming inner portions of the part adjacent the portions formed by said first pivoted mold members and including the interior of the tubular connecting portion, means for supporting said second mold members in molding position, means for supporting each of said first pivoted mold members in molding position with the free end thereof adjacent its associated second mold member, means for pivoting said first pivoted mold members during movement thereof out of molding position, so that said levers can be moved to move said elongated core members thereon out of molding position, drive means for rotating each of said rotatable members relative to its associated non-rotatable member whereby the threaded mounting of said non-rotatable member in said rotatable member causes said non-rotatable member to move axially relative to said rotatable member, interengaging means on each of said levers and its associated non-rotatable member for moving said lever substantially radially with respect to said non-rotatable member to move said lever's associated elongated second mold member into and out of molding position in a substantially linear direction during a portion of the movement of said non-rotatable member, said drive means rotating said rotatable members whereby each of said non-rotatable members moves axially relative to its associated rotatable member and said interengaging means move said levers to move said second mold members into molding position, said rotatable members and said non-rotatable members subsequently moving said threaded mold portions and said first pivoted mold members into molding position, and said drive means rotating said rotatable members to unscrew said threaded mold portions from screw threads formed thereby on the legs of the molded part, and to move said threaded mold portions and said first pivoted mold members out of molding position substantially through the open ends of the legs of the molded part with each of said first pivoted mold members pivoting about its pivotal axis, so that said second pivoted mold members can move out of molding position, said interengaging means subsequently moving said levers to move said second mold members out of molding position so that said second mold members can pivot and can move out of the open ends of the legs of the part.

3. Apparatus for molding a tubular part having a screw thread thereon, and having an opening therein and an inner cavity including a portion extending laterally inward with respect to an edge of the opening, which comprises a molding die, first and second coaxial and substantially cylindrical mold members screw threadably connected to one another, said first mold member further being screw threadably mounted on said molding die for rotation relative to said second mold member and including screw threaded mold means for forming the screw thread of the part, the pitch of the screw threads of the threaded mounting of said first mold member being substantially equal to the pitch of the screw threads of said threaded mold means, and the screw threads of the threaded mounting of said first mold member being of the opposite hand as compared to the screw threads of the threaded connection of said mold members to one another, first core means on said second mold member for forming an inner cavity portion of the part, a movable operating member, second core means on said operating member for forming the inner cavity portion of the part extending laterally inward with respect to the edge of the opening in the part, drive means for rotating said first mold member, means for preventing rotation of said second mold member so that said first mold member is rotated relative to said second mold member by said drive means, whereby said threaded mold means on said first mold member moves into and out of molding position and the threaded connection of said first and second mold members causes movement of said second mold member and said first core means thereon relative to said first mold member into and out of molding position, said drive means rotating said first mold member after a molding operation to unscrew said threaded mold means from the screw thread on the molded part, and interengaging means on said second mold and operating members for moving said operating member substantially radially with respect to the opening in the molded part after said first and second mold members and said threaded mold means on said first mold member and said first core means on said second mold member have been moved out of molding postion, to move said second core means on said operating member out of molding position so that said second core means can move through the opening in the molded part.

4. Apparatus for molding a tubular part having an opening therein and a cylindrical portion adjacent the opening, and having an inner cavity including an elongated portion extending laterally inward with respect to an edge of the opening, which comprises mold means for forming exterior portions of the part, a substantially cylindrical movable mold member for forming the cylindrical portion of the part adjacent the opening in the part, and having a substantially axially extending slot therethrough, an operating lever extending through the slot in said mold member and mounted for movement substantially radially with respect to said mold member, a first relatively elongated core member pivoted adjacent one of its ends on said lever for forming the elongated inner cavity portion of the part, a second core member pivoted adjacent one of its ends on said mold member for forming an inner cavity portion of the part adjacent the portion of the part formed by said first core member, means for supporting said first and second core members in molding position in spaced relationship with respect to said mold means and with the free end of said second core member adjacent said first core member, drive means for moving said mold member and said second core member thereon into and out of molding position, means for pivoting said second core member as said mold member moves out of molding position, so that said lever can be moved to move said first core member thereon out of molding position, and interengaging means on said mold member and said lever for moving said lever substantially radially with respect to said mold member and the opening in the molded part after said mold member and said second core member have been moved out of molding position, to move said first core member substantially longitudinally out of molding position so that it can pivot and move through the opening in the molded part.

5. Apparatus for molding a tubular part having an opening therein and having an inner cavity including an inner cylindrical cavity portion adjacent the opening and an elongated cavity portion extending laterally inward with respect to an edge of the opening, which comprises die members for forming exterior portions of the part, a substantially cylindrical movable first core member including mold means at one end thereof for forming the inner cylindrical cavity portion of the part adjacent the opening in the part, said core member having a substantially axially extending slot therethrough, an operating lever extending through the slot in said first core member and pivotally mounted adjacent one of its ends for movement substantialy radially with respect to said first core member, with its other end adjacent the one end of said first core member, a relatively elongated second core member pivoted adjacent one of its ends on the other end of said lever for forming the elongated inner cavity portion of the part, a third core member pivoted adjacent one of its ends on the one end of said first core member for forming another inner cavity portion of the part adjacent the portion of the part formed by said elongated core member, means for respectively supporting said second and third pivoted core members in molding position in spaced relationship with respect to said die members and including means on said first core member for supporting the free end of said pivoted third core member in molding position adjacent said second core member, drive means for moving said first core member and said pivoted third core member thereon into and out of molding position, means for pivoting said third core member as it moves out of molding position, so that said lever can be pivoted to move said elongated core member thereon out of molding position, and pin and slot means in said lever and said first core member for pivoting said lever substantially radially with respect to said first core member and the opening in the molded part in response to the movement of said first core member after said first and third core members have been moved out of molding position, to move said elongated core member substantially longitudinally out of molding postion so that it can pivot and move through the opening in the molded part.

6. Apparatus for molding a tubular part having a screw thread thereon, an opening therein, a cylindrical portion adjacent the opening, and an inner cavity including an elongated portion extending laterally inward with respect to an edge of the opening, which comprises first and second molding dies for forming exterior portions of the part, a first substantially cylindrical rotatable mold member screw threadably mounted on said first molding die, screw threaded mold means on said first mold member for forming the screw thread on the part, a second substantially cylindrical non-rotatable mold member for forming the cylindrical portion of the part adjacent the opening, said second mold member being coaxial with and screw threadably connected to said first mold member, and having a substantially axially extending slot therethrough, the screw threads of the threaded mounting of said first mold member on said first molding die being of the opposite hand as compared to the screw threads of the threaded connection of said first and second mold members, and the thread pitch of the threaded mounting of said first mold member being substantially equal to the thread pitch of said threaded mold means thereon, an operating lever extending through the slot in said second mold member and mounted for movement substantially radially with respect to said second mold member, a relatively elongated core member pivoted adjacent one of its ends on said lever for forming the elongated inner cavity portion of the part, a second core member pivoted adjacent one of its ends on said second mold member for forming an inner cavity portion of the part adjacent the portion of the part formed by said elongated core member, means for respectively supporting said core members in molding position in spaced relationship with respect to said first and second molding dies for forming the exterior portions of the part, with the free end of said second core member adjacent said elongated core member, drive means for rotating said first mold member, means for preventing rotation of said second mold member so that said first mold member is rotated relative to said second mold member by said drive means, whereby said first mold member moves said threaded mold means thereon into and out of molding position, and the threaded connection of said first and second mold members causes said second mold member and said second pivoted core member to move into and out of molding position, said drive means rotating said first mold member after a molding operation to unscrew said screw threaded mold means from the screw thread on the molded part, means for pivoting said second core member as said second mold core member moves out of molding position, so that said lever can be moved to move said elongated pivoted core member thereon out of molding position, and interengaging means on said lever and said second mold member for moving said lever substantially radially with respect to said second mold member and the opening in the molded part after said first mold member and said threaded mold means thereon, and said second mold member and said second pivoted core member have been moved out of molding position, to move said elongated core member substantially longitudinally out of molding position so that it can pivot and move through the opening in the molded part.

7. A molding apparatus comprising, two die sections mounted for closure to form a die cavity, a first hollow core mounted in one of the die sections for translatory movement into said die cavity, a mold member coaxially and rotatably mounted on said first core and projecting into said die cavity, a lever pivotally mounted on one of said die sections and extending through said first hollow core, a second core pivotally mounted on said lever to project into a molding position within said die cavity, means for rotating and axially moving said mold member from said die cavity, means responsive to the rotation of said mold member for imparting a translatory movement to said first core to withdraw said first core from the cavity, and means connected to said first core and rendered effective by the translatory movement of said first core for pivoting said lever and withdrawing said second core from the molding position within the die cavity.

8. An apparatus for molding a part in a cavity formed between a pair of dies comprising, a first hollow core means mounted in one of said dies for translatory movement to position a core section in said cavity, a mold member mounted about said first core means and having a section projecting into said cavity, a second articulated core means pivotally mounted on said one of said dies and projecting through said first hollow core means into said cavity, drive means for withdrawing said mold member from within said cavity, means responsive to the movement of said mold member for imparting a translatory movement to said first core means to withdraw said core section from within the cavity at a greater rate than the rate of withdrawal of said mold member, and means actuated by the movement of said first core means for pivoting said second core means to move within said cavity.

References Cited in the file of this patent

UNITED STATES PATENTS

| | | |
|---|---|---|
| 1,679,016 | Ashton | July 31, 1928 |
| 1,679,330 | Soderlund | July 31, 1928 |
| 1,959,612 | Burke | May 22, 1934 |
| 2,262,053 | Schultz | Nov. 11, 1941 |
| 2,286,994 | Nocar | June 16, 1942 |
| 2,860,376 | Graves | Nov. 18, 1958 |
| 2,874,414 | Sargent | Feb. 24, 1959 |

FOREIGN PATENTS

| | | |
|---|---|---|
| 1,237,243 | France | June 20, 1960 |
| 782,437 | Great Britain | Sept. 4, 1957 |